United States Patent
Shieh

(10) Patent No.: US 6,845,061 B2
(45) Date of Patent: Jan. 18, 2005

(54) METHOD FOR QUICKLY DETECTING THE STATE OF A NONVOLATILE STORAGE MEDIUM

(75) Inventor: Sheng-Zhong Shieh, Hsinchu (TW)

(73) Assignee: Megawin Technology Co., Ltd., Hsinchu (TW)

( * ) Notice: Subject to any disclaimer, the term of this patent is extended or adjusted under 35 U.S.C. 154(b) by 121 days.

(21) Appl. No.: 10/358,273

(22) Filed: Feb. 5, 2003

(65) Prior Publication Data
US 2004/0151055 A1 Aug. 5, 2004

(51) Int. Cl.$^7$ ................................................ G11C 8/00
(52) U.S. Cl. ............................... 365/238.5; 365/185.11; 365/185.29
(58) Field of Search ....................... 365/238.5, 185.11, 365/185.29, 230.03, 230.01, 221

(56) References Cited

U.S. PATENT DOCUMENTS 6,591,330 B2 * 7/2003 Lasser ........................ 711/103

2003/0020687 A1 * 1/2003 Sowden et al. ............. 345/157
2003/0189660 A1 * 10/2003 Takeuchi et al. ............ 365/200

* cited by examiner

Primary Examiner—Michael S. Lebentritt
Assistant Examiner—Dang T Nguyen
(74) Attorney, Agent, or Firm—Rosenberg, Klein & Lee

(57) ABSTRACT

A method for quickly detecting the state of a nonvolatile storage medium having a plurality of blocks therein is proposed. When the system stores data in any page of a blank block, the first page thereof is simultaneously marked. When there already is data in a block to be written in, because the first page of the block is already marked, it is not necessary to mark again. Therefore, it is only necessary to directly read the first page in each block when searching the block states in the nonvolatile storage medium. The state of the nonvolatile storage medium can be quickly detected based on the existence of a mark, hence effectively enhancing the performance of data access.

8 Claims, 5 Drawing Sheets

METHOD FOR QUICKLY DETECTING THE STATE OF A NONVOLATILE STORAGE MEDIUM

FIELD OF THE INVENTION

The present invention relates to a method for detecting the state of a nonvolatile storage medium and, more particularly, to a method utilizing logic addresses as marks to quickly detect the state of a nonvolatile storage medium when writing in data.

BACKGROUND OF THE INVENTION

The most important factor of performance of a memory is its access time. The time spent from when a microprocessor issues an instruction to get address data through when a memory responds to transmit data to the microprocessor to when the microprocessor actually receives the data is the access time of the memory.

A nonvolatile storage medium uses a page composed of a plurality of bytes as the unit for storage and readout of data. Each page for data access has a physical address to represent the space order in the nonvolatile storage medium, e.g., the position of physical blocks in a static random access memory (SRAM). Simultaneously, each block records a logical address marked by the file system to let each physical address have a corresponding logical address.

As shown in FIG. 1(a), a block 10 of a conventional memory can be divided into a plurality of pages (usually 16 or 32 pages). Each page has a plurality of bytes (usually 512 bytes). When writing data into the nonvolatile memory, it is uncertainly to start writing from the first page. As shown in FIG. 1(b), 3 pages of data have been written into the middle section of the block 10. Before the nonvolatile memory is used (i.e., writing data into a page of the block 10), one must make sure the block 10 is blank for writing in data. Therefore, it is necessary to find out a blank block 10 when writing in data. Because it is uncertainly starting from the first page of the block 10 when writing in data before, each page needs to be read in turn to exactly know whether the block 10 is blank or not. Because each page in each block needs to be searched when writing in data each time, the search time is long, letting the speed of data access of the memory be slow.

Accordingly, the present invention aims to propose a method for quickly detecting the state of a nonvolatile storage medium to resolve the above problems in the prior art.

SUMMARY OF THE INVENTION

The primary object of the present invention is to provide a method for quickly detecting the state of a nonvolatile storage medium, wherein a logic address corresponding to a block is simultaneously utilized to mark the state of the block when storing data into the block.

Another object of the present invention is to provide a method for quickly detecting the state of a nonvolatile storage medium, whereby it is not necessary to read each page in a block for exactly knowing the state of the block. The effect of quickly detecting the state of a nonvolatile storage medium can be accomplished based only on the existence of a mark. Therefore, the performance of data access can be effectively enhanced.

The present invention provides a method for quickly detecting the state of a nonvolatile storage medium. If a block to be written into by the system is blank, a mark is simultaneously made in at least a page thereof when storing data in any page in the block. When the system stores data into a block which already has data, because at least a page of the block is marked, it is not necessary to mark again. Therefore, it is only necessary to directly read the marked page in each block when searching the block states in the nonvolatile storage medium. The state of the nonvolatile storage medium can be quickly detected based on the existence of the mark, hence effectively enhancing the performance of data access.

The various objects and advantages of the present invention will be more readily understood from the following detailed description when read in conjunction with the appended drawings, in which:

DETAILED DESCRIPTION OF THE PREFERRED EMBODIMENTS

In the present invention, when writing data into a block of a memory, a logic address is simultaneously utilized to mark in any page of the block. During the process of data storage, the action of marking is continually performed. When searching the states of blocks, it is only necessary to read the marked page of each block to immediately know the state of each block base on the existence of the mark.

Figure 1B:
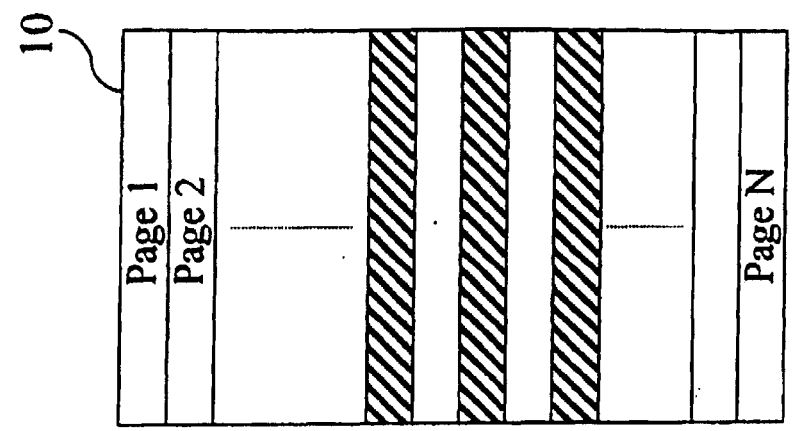
FIGS. 1(a) and 1(b) are a diagram of a conventional memory block and a diagram showing data have been written into the conventional memory block, respectively.
Figure 1A:
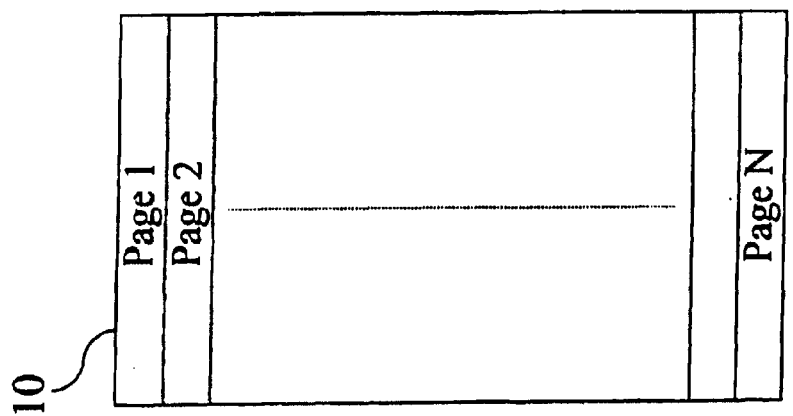
Figure 2:
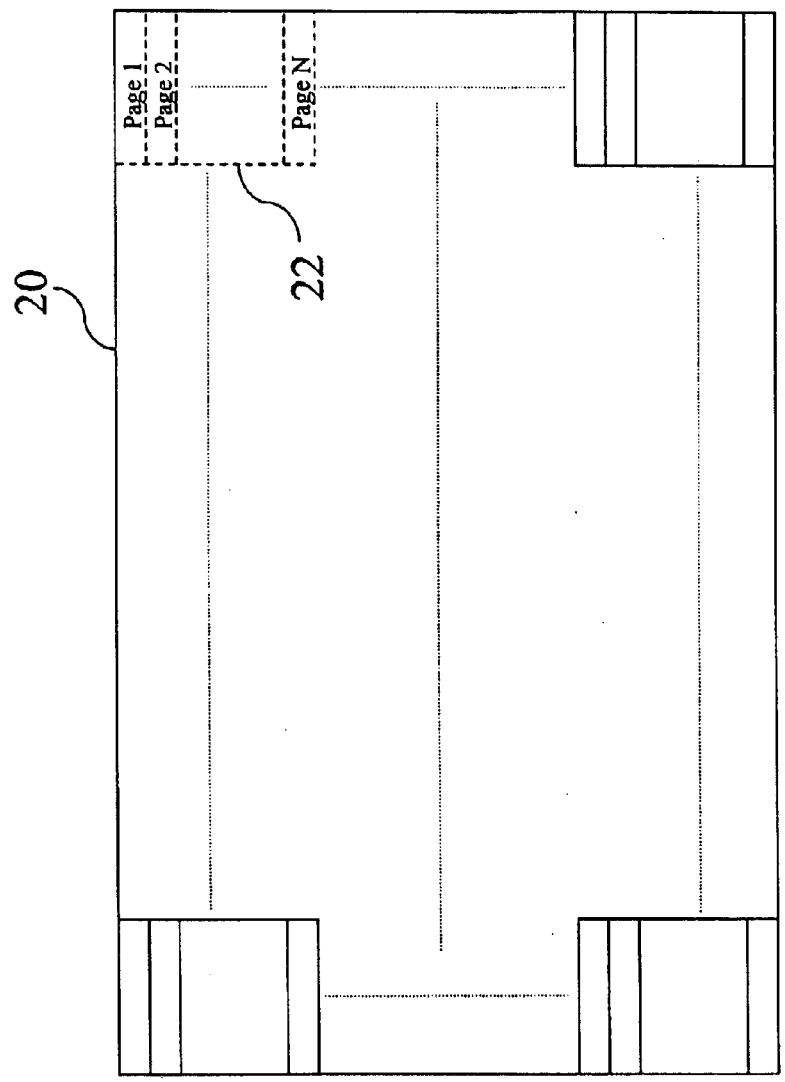
FIG. 2 is a diagram of a nonvolatile storage medium having a plurality of blocks of the present invention.
Figure 3:
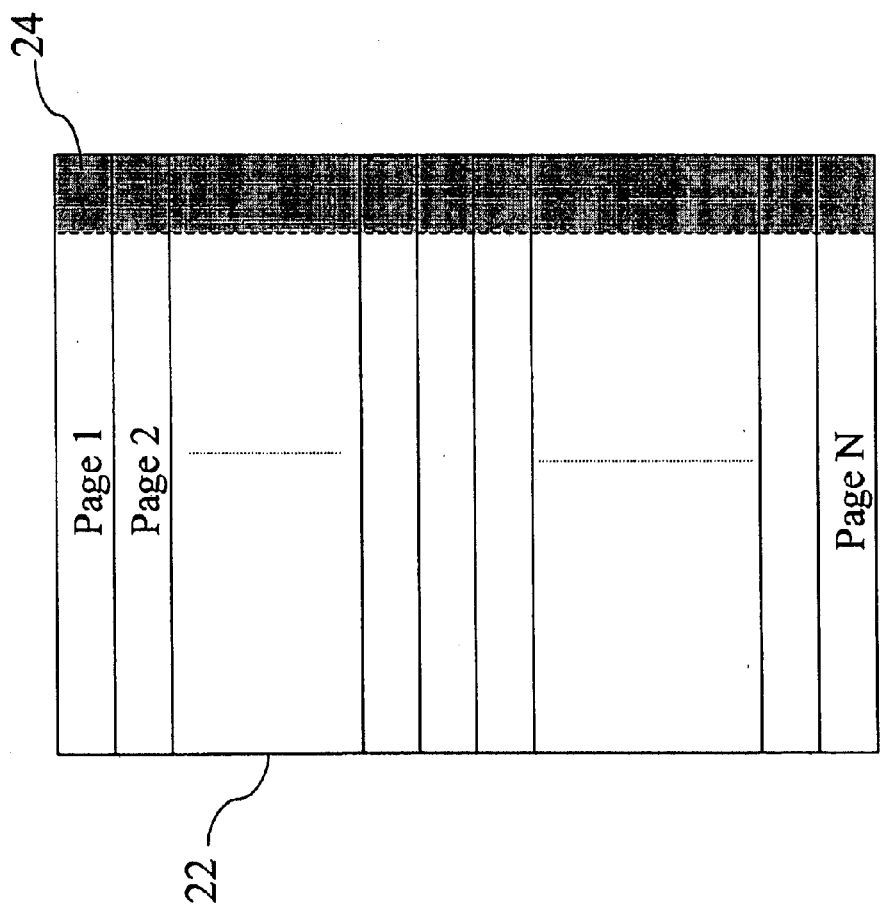
FIG. 3 is a diagram of a block having spare bytes of the present invention.

When performing storage or readout of data in a nonvolatile memory like a flash memory, each block for data access has a physical address to represent the position of the real memory. The physical address of each block has a corresponding logical address. As shown in FIG. 2, before a nonvolatile storage medium 20 is used, an action of erasing data needs to be performed in advance. The unit for erasing data is called a block. That is, the nonvolatile storage medium 20 has a plurality of blocks 22 therein. Each block 22 can further be divided into a plurality of pages. After erasion of data is finished, each block 22 in the nonvolatile storage medium 20 becomes blank. Please also refer to FIG. 3. Each page has a spare byte 24 therein.

Figure 4:
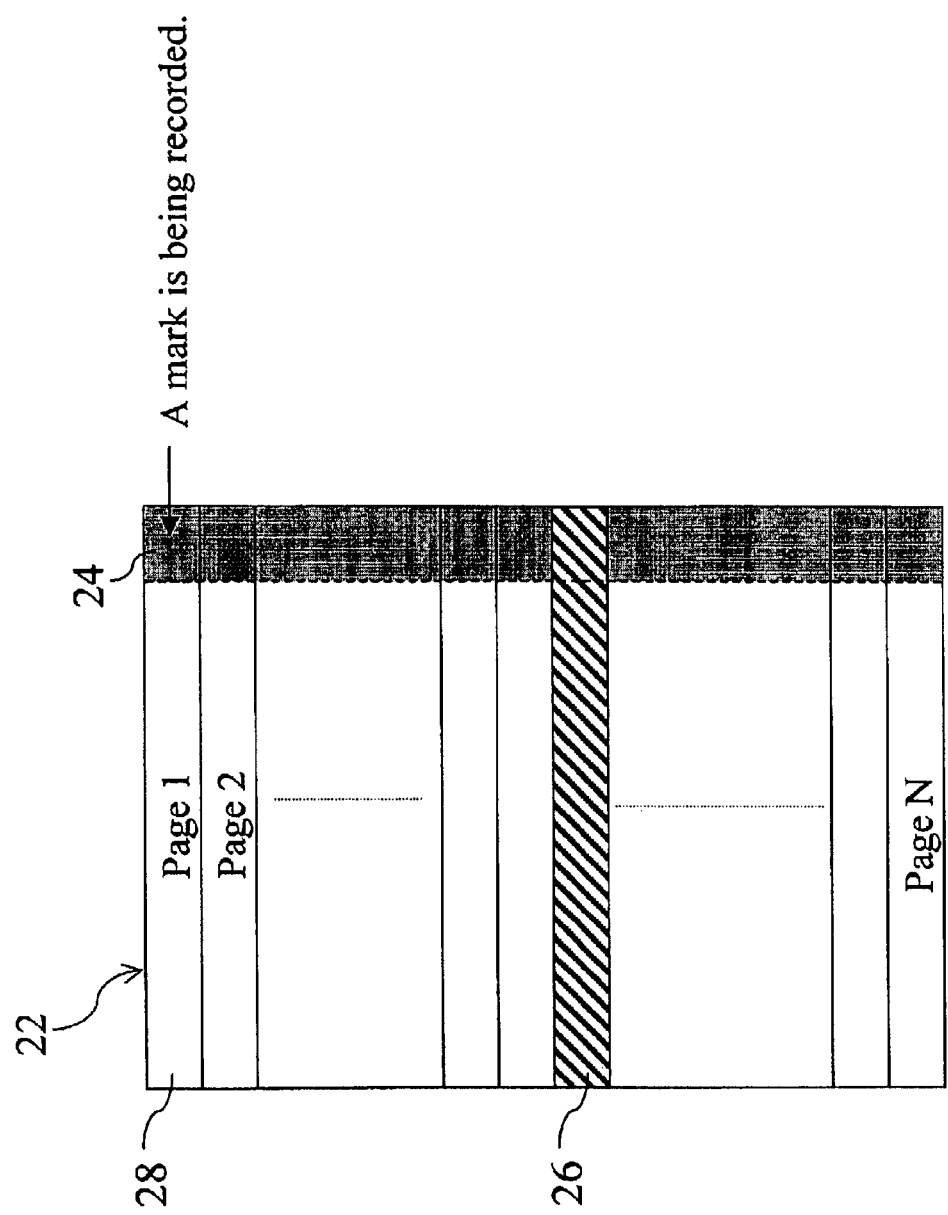
FIG. 4 is a diagram showing a mark is being recorded into a block of the present invention.
Figure 5:
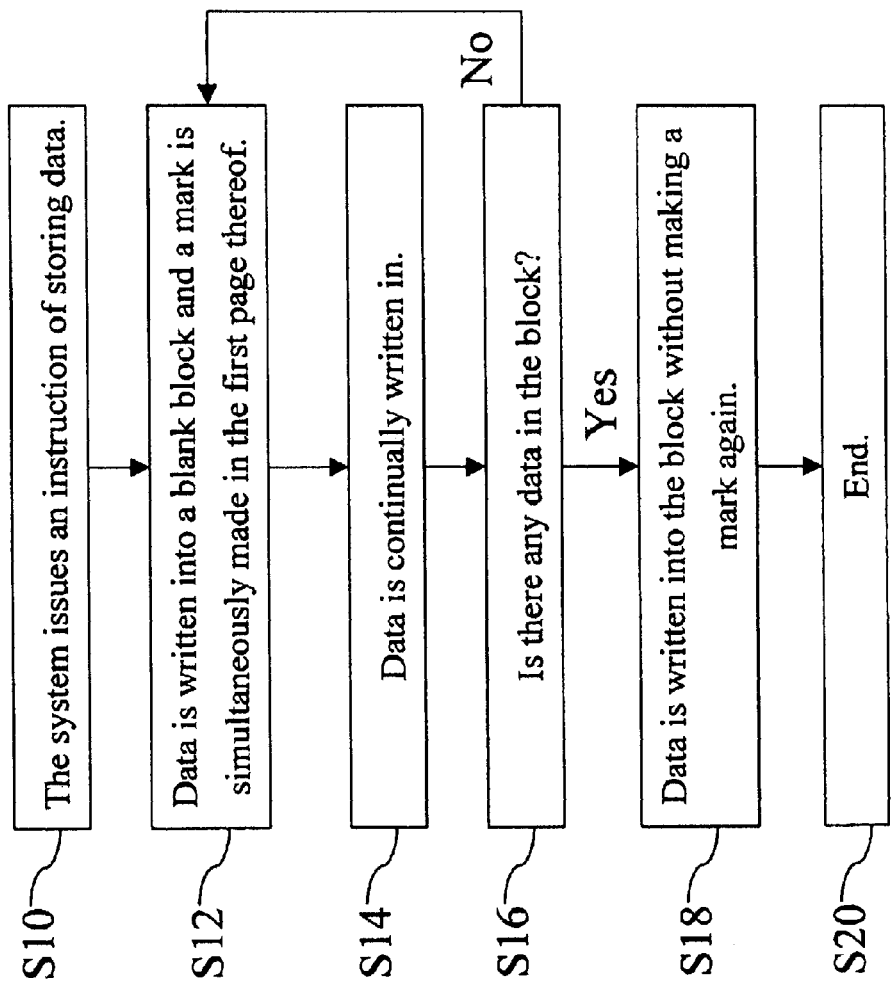
FIG. 5 is a flowchart of recording a mark during the process of data storage of the present invention.

FIG. 4 is a diagram showing a mark is recorded into a block of the present invention. Please refer to the flowchart of FIG. 5 at the same time. First, the system issues an instruction of storing data (Step S10). Next, when data is written into any page 26 in a blank block 22 of the nonvolatile storage medium 20, a mark is simultaneously recorded in the spare byte 24 of one of the pages (Step 12). This mark is made by using the logical address of the block 22. The marked page will be called as the first page 28 hereinafter for illustration. Subsequently, the action of writing in data is continually performed (Step S14). Whether there is any data in a block 22 to be written by the system is determined (Step S16). If the answer is yes, it enters into Step S18. Because the first page 28 of the block 22 has been marked, it represent the block 22 which data will be written into already having data, and it is not necessary to make a mark again; otherwise, Step S16 jumps back to Step S12 and repeating the above steps until data written is finished, i.e., Step S20. And the flowchart is finally ended (Step S20) Therefore, when searching the states of blocks in a nonvolatile storage medium 20, it is only necessary to directly read the first page 28 in each block 22 to quickly detect the state of the nonvolatile storage medium 20 based on the existence of a mark.

In the present invention, the action of marking is performed momentarily when storing data. The mark in the first page 28 of the block 22 is discriminated as useable or useless. If the block 22 is usable, the mark can further be discriminated as used or not used. On the other hand, after data in the block 22 have been erased, the mark in the first page 28 is immediately erased to let the block 22 become a blank block again.

To sum up, using the method of the present invention when searching and detecting the states of blocks in a nonvolatile storage medium, it is only necessary to directly read the first page of each block to immediately know the state of each block based on the existence of a mark. Moreover, in the present invention, because the logical address of a block is simultaneously recorded in one of the pages as a mark when writing in data, the effect of quickly detecting the state of a nonvolatile storage medium can be accomplished, hence effectively enhancing the performance of data access.

Although the present invention has been described with reference to the preferred embodiments thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. A method for quickly detecting the state of a nonvolatile storage medium, said method being used to detect the states of a plurality of blocks in a nonvolatile storage medium, said method comprising the steps of:

simultaneously marking at least a page when the system stores data into any page in a blank block of said nonvolatile storage medium;

not marking again when there already is data in the block to be written in because at least a page of said block is already marked;

directly reading said marked page in each block when searching blocks in said nonvolatile storage medium to quickly detect the state of said nonvolatile storage medium based on the existence of said mark.

2. The method for quickly detecting the state of a nonvolatile storage medium as claimed in claim 1, wherein said block is the unit for erasion.

3. The method for quickly detecting the state of a nonvolatile storage medium as claimed in claim 1, wherein said mark is recorded in a spare byte of said page.

4. The method for quickly detecting the state of a nonvolatile storage medium as claimed in claim 1, wherein said mark is a logical address of said block.

5. The method for quickly detecting the state of a nonvolatile storage medium as claimed in claim 1, wherein said mark is discriminated between useable and useless.

6. The method for quickly detecting the state of a nonvolatile storage medium as claimed in claim 1, wherein said mark is discriminated between used and not used.

7. The method for quickly detecting the state of a nonvolatile storage medium as claimed in claim 1, wherein said mark is also erased after data in said block has been erased.

8. The method for quickly detecting the state of a nonvolatile storage medium as claimed in claim 1, wherein the action of marking is performed whenever storing data.

* * * * *